US012715336B2

(12) United States Patent
Salter et al.

(10) Patent No.: US 12,715,336 B2
(45) Date of Patent: Aug. 25, 2026

(54) CONTROL AND MANAGEMENT OF UPFITTER AND VEHICLE LOADS

(71) Applicant: FORD GLOBAL TECHNOLOGIES, LLC, Dearborn, MI (US)

(72) Inventors: Stuart C. Salter, White Lake, MI (US); Jeffrey Robert Seaman, Petersburg, MI (US); David Celinske, Wolverine Lake, MI (US); Brendan F. Diamond, Grosse Pointe, MI (US); Christopher Ballard, Redford, MI (US); Todd Ansbacher, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 34 days.

(21) Appl. No.: 18/485,638

(22) Filed: Oct. 12, 2023

(65) Prior Publication Data

US 2025/0121737 A1 Apr. 17, 2025

(51) Int. Cl.

| | |
|---|---|
| ***B60L 53/24*** | (2019.01) |
| ***B60L 50/60*** | (2019.01) |
| ***B60L 58/12*** | (2019.01) |
| ***B60L 58/18*** | (2019.01) |
| ***B60R 16/023*** | (2006.01) |
| ***B60R 16/033*** | (2006.01) |

(52) U.S. Cl.

CPC ............... *B60L 58/18* (2019.02); *B60L 50/60* (2019.02); *B60L 58/12* (2019.02); *B60R 16/0238* (2013.01); *B60R 16/033* (2013.01); *B60L 2210/10* (2013.01); *B60L 2240/545* (2013.01)

(58) Field of Classification Search

CPC ...................................................... B60L 58/18

See application file for complete search history.

(56) References Cited

U.S. PATENT DOCUMENTS

| | | | | |
|---|---|---|---|---|
| 7,258,183 | B2 * | 8/2007 | Leonardi | B60K 6/28 903/930 |
| 9,073,444 | B2 | 7/2015 | Ito et al. | |
| 2005/0061561 | A1 * | 3/2005 | Leonardi | B60W 20/10 180/65.21 |
| 2012/0299544 | A1 | 11/2012 | Prosser et al. | |
| 2013/0181516 | A1 | 7/2013 | Phan | |
| 2023/0035744 | A1 * | 2/2023 | Gao | B60L 53/62 |

(Continued)

FOREIGN PATENT DOCUMENTS

| | | |
|---|---|---|
| JP | 2008537528 A | 9/2008 |
| JP | 2022025485 A | 2/2022 |

(Continued)

*Primary Examiner* — Menatoallah Youssef
*Assistant Examiner* — Esayas G Yeshaw
(74) *Attorney, Agent, or Firm* — Frank Lollo; Brooks Kushman P.C.

(57) ABSTRACT

While a state of charge of a supplemental battery, that provides power to an electrical bus via a first DC/DC converter, is greater than a predefined threshold and responsive to a magnitude of current associated with loads on the electrical bus exceeding a predefined value, a controller reduces a setpoint of the first DC/DC converter to equal that of a second DC/DC converter, that transfers power between the electrical bus and a traction battery, such that the loads are powered by the supplemental and traction batteries.

14 Claims, 1 Drawing Sheet

(56) References Cited

U.S. PATENT DOCUMENTS

2023/0117539 A1* 4/2023 Detweiler ........... H02J 7/00712 307/24
2023/0261487 A1* 8/2023 Cai ......................... B60L 58/12 320/128
2023/0261559 A1* 8/2023 Redler ................ H02M 3/1582 307/18
2023/0299369 A1* 9/2023 Anderson ............... B60L 58/16 320/150
2024/0243603 A1* 7/2024 Li ........................... B60L 53/53

FOREIGN PATENT DOCUMENTS

JP 2022091016 A 6/2022
KR 101736989 B 4/2017

* cited by examiner 10
12
Traction Battery 14
Supplemental Battery 18
Controller(s) 22
DC/DC Converter 16
DC/DC Converter 20
DC/DC Converter 24
26
Upfitter Loads 28

30
32
Engine 34
Supplemental Battery 38
Controller(s) 42
Alternator 36
DC/DC Converter 40
44
Upfitter Loads 46

CONTROL AND MANAGEMENT OF UPFITTER AND VEHICLE LOADS

TECHNICAL FIELD

This disclosure relates to automotive power systems.

BACKGROUND

An automotive vehicle may include an energy storage device, such as a battery. This energy may be made available to electrical and electronic components of the vehicle and outside the vehicle. After-market snow plow equipment, for example, may be powered by energy from a battery. Such connections with the battery may be facilitated by a so-called upfitter module.

SUMMARY

A power system for a vehicle includes an electrical bus, a first DC/DC converter that transfers power between the electrical bus and a traction battery, a second DC/DC converter that transfers power between a supplemental battery and the electrical bus, and one or more controllers that, responsive to a state of charge of the supplemental battery falling below a predefined threshold, reduces a setpoint of the second DC/DC converter to less than that of the first DC/DC converter such that loads on the electrical bus are powered by the traction battery and not the supplemental battery.

A method for a vehicle includes, while a state of charge of a supplemental battery, that is configured to provide power to an electrical bus via a first DC/DC converter, is greater than a predefined threshold and responsive to a magnitude of current associated with loads on the electrical bus exceeding a predefined value, reducing a setpoint of the first DC/DC converter to equal that of a second DC/DC converter, that is configured to transfer power between the electrical bus and a traction battery, such that the loads are powered by the supplemental and traction batteries.

A vehicle includes an electrical bus, an alternator that provides power to the electrical bus, a battery, a DC/DC converter that transfers power between the battery and electrical bus, and one or more controllers that, responsive to a state of charge of the battery falling below a predefined threshold, reduces a setpoint of the DC/DC converter to less than that of the alternator such that loads on the electrical bus are powered by the alternator and not the battery.

DETAILED DESCRIPTION

Figures 1, 2:
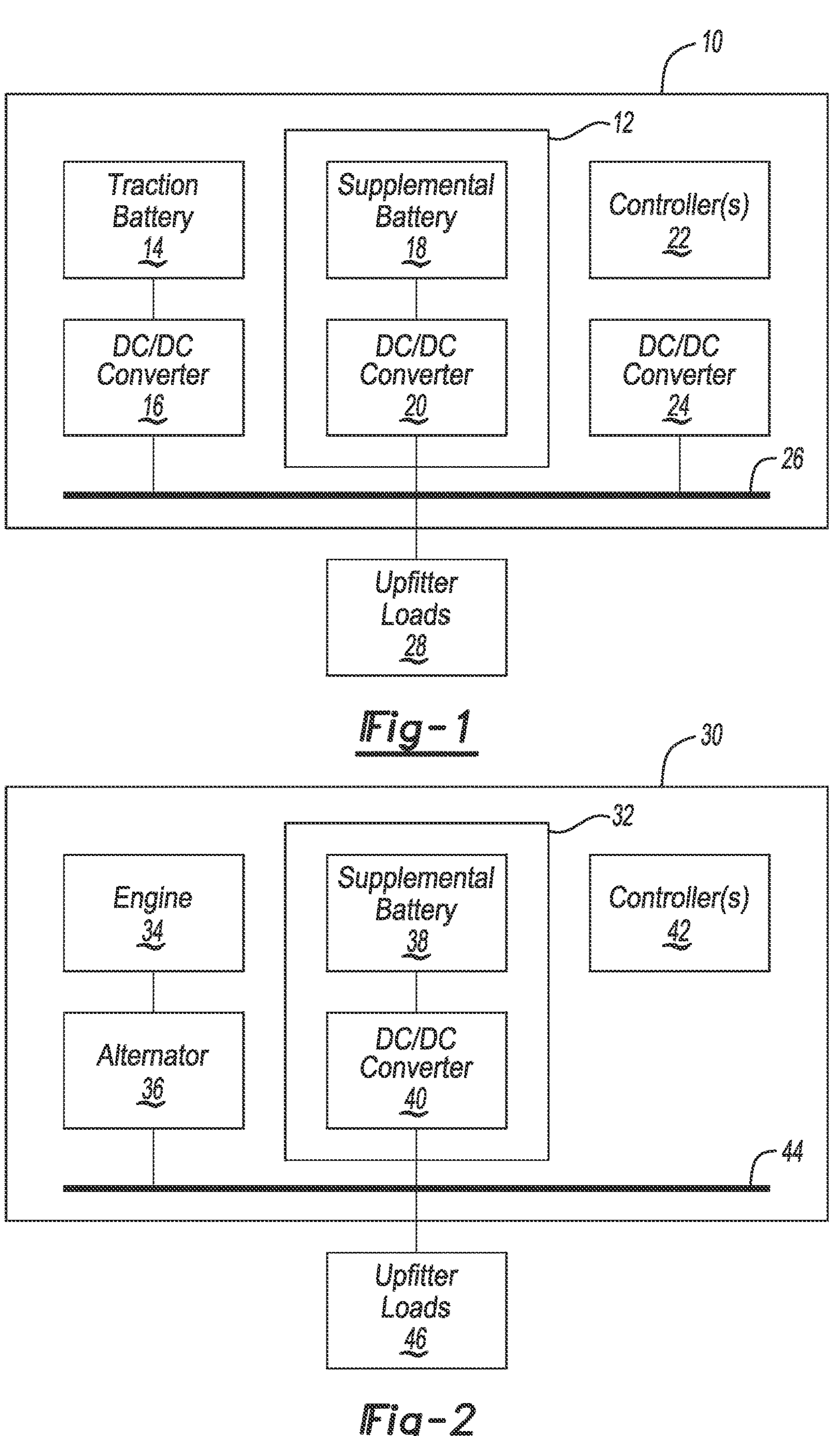
FIG. 1 is a schematic diagram of portions of a battery electric vehicle.
FIG. 2 is a schematic diagram of portions of an internal combustion engine vehicle.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Automotive vehicles typically include a power supply to facilitate functioning of various electrical and electronic components. Several power supply architectures are commonly used in automotive applications, including centralized, decentralized, and hybrid power supply architectures.

Centralized power supply architectures can include a single power supply unit that provides power to all electrical and electronic components in the vehicle. This architecture may be simple and easy to install. In some circumstances however, it may not be suitable for vehicles with high power requirements or those that have different voltage levels for different components.

Decentralized power supply architectures can include multiple power supply units located near the components they power. This architecture may be more flexible than centralized power supply architectures as it permits different voltage levels to be provided to different components. It can also be efficient by reducing the power loss that occurs when power is transmitted over relatively long distances. Decentralized power supply architectures, however, can be more complex with the potential increase in number of connections between power supply units and corresponding components.

Hybrid power supply architectures can be a combination of centralized and decentralized power supply architectures: A central power supply unit provides power to some electrical and electronic components, while other components are powered by decentralized power supply units. This architecture, in certain applications, may provide a balance between flexibility and efficiency.

The use of upfitter modules can affect the power supply systems of automotive vehicles. Upfitter modules, in some examples, are modular components that can be added to a vehicle to provide additional upfitter functionality, such as lighting, power distribution, or electrical power management. An upfitter module that provides lighting and power distribution, for example, can be installed in a vehicle, allowing it to be used as a work vehicle, such as a service truck or construction vehicle. Additionally, upfitter modules can be designed to meet specific requirements, such as providing power to a specific upfitter component or group of upfitter components (upfitter loads).

Several factors can be considered when selecting an upfitter module, including the power requirements of the component or group of components that the upfitter module will power, the voltage level required, and the environmental conditions in which the upfitter module will be used.

Certain upfitter modules have taken the form of switches mounted in an over-head compartment and relays in an add-on engine compartment power distribution box. In some arrangements, wires are fed to the engine compartment power distribution box, but not connected to relays. Screens may be used to support touch drive of field effect transistors that control loads.

DC/DC converters may convert the voltage level of DC electricity from one level to another. Some vehicles (e.g., electric or hybrid vehicles) may feature batteries that have an integrated DC/DC converter. That is, the DC/DC converter is physically built into the battery pack or closely integrated with it. This integration may help optimize the use of available space and reduce the need for additional components.

A primary function of a DC/DC converter in this context may be to convert high-voltage DC power generated by a battery (typically several hundred volts) into lower-voltage DC power suitable for charging another battery or powering various vehicle systems and accessories (e.g., upfitter loads).

To support rescue and disaster relief, large batteries (e.g., 12V deep cycle or high voltage batteries) may be added to beds of vehicles (e.g., trucks). These batteries may have a DC/DC converter integrated therewith. Vehicles equipped with so-called bed batteries may provide power for extended periods without having access to charging stations. Swapping the batteries may therefore be necessary. It may be desirable to provide continuous power even when the batteries are being swapped or when their state of charge is low.

Within the context of a battery electric vehicle, power flow from traction and bed-batteries can be controlled via manipulation of the associated DC/DC converter setpoints. During situations in which a vehicle is providing power in a rescue situation, the voltage setpoint of the DC/DC converter integrated with the bed battery may be set slightly higher than that of the main DC/DC converter associated with the traction battery. For example, if the setpoint of the main DC/DC converter is 13V, the setpoint of the integrated DC/DC converter may be 13.1V. The setpoint of any additional DC/DC converter in the vehicle may be set slightly lower than that of the main DC/DC converter (e.g., 12.9V). Upfitter loads being serviced by the vehicle would thus be powered by the bed battery and not the traction battery until the loads would be sufficient to reduce the system voltage from 13.1V to 13V—at which time power from the traction and bed batteries would service the upfitter loads.

This multi-battery multi-DC/DC converter arrangement may also permit power from one of the batteries to be used to charge the other of the batteries. Continuing with the above example, the integrated DC/DC converter may be operated to transfer power from the bed battery to an electrical bus common with the main DC/DC converter. At a same time, the main DC/DC converter may be operated to transfer power from the electrical bus to the traction battery to charge the traction battery. Other scenarios are also possible.

When a state of charge of the bed battery falls below some threshold (e.g., 15%), the integrated DC/DC converter setpoint may be reduced to below that of the main DC/DC converter. Continuing with the example above, the integrated DC/DC converter setpoint may be reduced to 12.9V while the main DC/DC converter setpoint may remain at 13.0V. Upfitter loads being serviced by the vehicle would thus be powered by the traction battery and not the bed battery. During this interim, the bed battery may be swapped or charged. Once complete, the setpoint of the integrated DC/DC converter may be returned to 13.1V as the state of charge would be greater than 15%.

Load sharing between the batteries may be performed under certain conditions, such as load, temperature, and state of charge conditions. If, for example, a current magnitude associated with the upfitter loads exceeds some threshold value (e.g., 250 A) while a state of charge of the bed battery is greater than some value (e.g., 40%), the setpoint of the integrated DC/DC converter may be set equal to that of the main DC/DC converter such that power from the traction and bed batteries satisfies the upfitter loads.

Further conditions can influence the mix of power supplied by the traction and bed batteries once the setpoints are equal. If for example the setpoints are set equal at 100 A of upfitter loads, additional load current beyond the 100 A may be satisfied 80% by the traction battery and 20% by the bed battery (e.g., at 200 A, the bed battery would supply 120 A and the traction battery would supply 80 A). Additional load current beyond 300 A for example, may be exclusively satisfied by the traction battery (e.g., at 500 A, the bed battery would supply its maximum current of 140 A, and the traction battery would supply 360 A).

Relative temperatures of the DC/DC converter and/or batteries may be used to split power therebetween. If for example the temperature of the integrated DC/DC converter and/or bed battery falls outside some desired range, demand for additional load current may be satisfied by the traction battery to maintain or reduce temperature increases on the integrated DC/DC converter and/or bed battery.

Similarly, demand for additional load current may be satisfied by the battery having the higher state of charge. If the traction battery has a state of charge of 80% and the bed battery has a state of charge of 50%, demand for additional load current may be satisfied by the traction battery rather than the bed battery to better conserve the charge available from the bed battery.

Within the context of a vehicle that includes an internal combustion engine, power flow from the alternator and bed battery can be controlled via manipulation of the alternator and integrated DC/DC converter setpoints in a manner similar to that described above. That is, the integrated DC/DC converter setpoint may be set higher than that of the alternator in certain situations so that power from the bed battery is used first to satisfy loads. The integrated DC/DC converter setpoint may be set lower than that of the alternator when the state of charge of the bed battery falls below some threshold. The setpoints may be set equal when the demand for load current exceeds some value. And the mix of power supplied by the alternator and bed battery may depend on the magnitude of load current, temperatures of the integrated DC/DC converter and/or bed battery, and the state of charge of the bed battery.

Referring to FIG. 1, a vehicle 10 includes a bed 12 (e.g., a truck bed), a traction battery 14, a DC/DC converter 16 (e.g., a main DC/DC converter), a supplemental battery 18, a DC/DC converter 20 (e.g., an integrated DC/DC converter), one or more controllers 22, a DC/DC converter 24 (e.g., a protected DC/DC converter), and an electrical bus 26. For clarity and ease of understanding, other known vehicle and electrical components (e.g., power electronic components, power distribution components, upfitter modules, switches, etc.) have been omitted.

The DC/DC converter 16 is electrically connected between the traction battery 14 and electrical bus 26. The DC/DC converter 20 is electrically connected between the supplemental battery 18 and electrical bus 26. The supplemental battery 18 and DC/DC converter 20 are located within the bed 12. The DC/DC converter 24 is electrically connected with the electrical bus 26.

Upfitter loads 28 are also electrically connected with the electrical bus 26 via standard upfitter technology (e.g., an upfitter module). The upfitter module may further facilitate the electrical connection between the DC/DC converter 20 and the electrical bus 26. That is, the DC/DC converter 20 may access the electrical bus 26 via the upfitter module.

The one or more controllers 22 are in communication with and/or exert control over components associated with FIG. 1. Standard sensors, such as temperature sensors, current sensors, etc., may facilitate this communication and control. Each of the components, for example, may have a standard temperature sensor and current sensor associated therewith and in communication with the one or more controllers 22. As such, the one or more controllers 22 may implement the various DC/DC setpoint control strategies described above. The one or more controllers 22, for example, may reduce the setpoint of the DC/DC converter 20 to less than that of the DC/DC converter 16 responsive to a state of charge of the supplemental battery 18 falling below some predefined threshold such that the upfitter loads 28 are powered by the traction battery 14 and not the supplemental battery 18. The one or more controllers 22 may, responsive to the state of charge exceeding the predefined threshold, increase the setpoint to greater than that of the DC/DC converter 16 such that the upfitter loads 28 are powered by the supplemental battery 18 and not the traction battery 14. The one or more controllers 22 may, provided the state of charge is greater than the predefined threshold, set equal the setpoints of the DC/DC converters 16, 20 such that the upfitter loads 28 are powered by the traction and supplemental batteries 14, 18. And, the mix of power from the traction and supplemental batteries 14, 18 can be altered as described above according to the magnitude of the load current, temperature, and state of charge, etc.

Referring to FIG. 2, a vehicle 30 includes a bed 32 (e.g., a truck bed), an engine 34, an alternator 36, a supplemental battery 38, a DC/DC converter 40 (e.g., an integrated DC/DC converter), one or more controllers 42, and an electrical bus 46. As with FIG. 1, other known vehicle and electrical components (e.g., power electronic components, power distribution components, upfitter modules, switches, etc.) have been omitted.

The alternator 36 is connected between the engine 34 and electrical bus 44. The DC/DC converter 40 is electrically connected between the supplemental battery 38 and electrical bus 44. The supplemental battery 38 and DC/DC converter 40 are located within the bed 32.

Upfitter loads 46 are also electrically connected with the electrical bus 44 via standard upfitter technology. Similar to FIG. 1, an upfitter module may facilitate the electrical connection between the DC/DC converter 40 and the electrical bus 44.

The one or more controllers 42 are in communication with and/or exert control over the components associated with FIG. 2. Similar to FIG. 1, standard sensors, such as temperature sensors, current sensors, etc., may facilitate this communication and control. As such, the one or more controllers 42 may implement the various DC/DC setpoint control strategies described above.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of these disclosed materials. The terms "controller" and "controllers," for example, can be used interchangeably herein as the functionality of a controller can be distributed across several controllers/modules, which may all communicate via standard techniques.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A power system for a vehicle comprising:

an electrical bus;

a first DC/DC converter configured to transfer power between the electrical bus and a traction battery;

a second DC/DC converter configured to transfer power between a supplemental battery and the electrical bus; and one or more controllers programmed to, responsive to a state of charge of the supplemental battery falling below a predefined threshold, reduce a setpoint of the second DC/DC converter to less than that of the first DC/DC converter such that loads on the electrical bus are powered by the traction battery and not the supplemental battery.

2. The power system of claim 1, wherein the one or more controllers are further programmed to, responsive to the state of charge exceeding the predefined threshold, increase the setpoint to greater than that of the first DC/DC converter such that loads on the electrical bus are powered by the supplemental battery and not the traction battery.

3. The power system of claim 1, wherein the one or more controllers are further programmed to, while the state of charge is greater than the predefined threshold and responsive to a magnitude of current associated with the loads exceeding a predefined value, reduce the setpoint to equal that of the first DC/DC converter such that the loads are powered by the traction battery and supplemental battery.

4. The power system of claim 3, wherein the one or more controllers are further programmed to alter relative amounts of power provided by the traction and supplemental batteries according to the magnitude.

5. The power system of claim 3, wherein the one or more controllers are further programmed to alter relative amounts of power provided by the traction and supplemental batteries according to a temperature.

6. The power system of claim 3, wherein the one or more controllers are further programmed to alter relative amounts of power provided by the traction and supplemental batteries according to the state of charge of the supplemental battery and a state of charge of the traction battery.

7. The power system of claim 1, wherein the one or more controllers are further programmed to operate the first and second DC/DC converters to charge the traction battery with power from the supplemental battery.

8. The power system of claim 1 further comprising a third DC/DC converter having a setpoint less than that of the first DC/DC converter.

9. The power system of claim 1, wherein the supplemental battery is disposed within a bed of the vehicle.

10. A method for a vehicle comprising:

while a state of charge of a supplemental battery, that is configured to provide power to an electrical bus via a first DC/DC converter, is greater than a predefined threshold and responsive to a magnitude of current associated with loads on the electrical bus exceeding a predefined value, reducing a setpoint of the first DC/DC converter to equal that of a second DC/DC converter, that is configured to transfer power between the electrical bus and a traction battery, such that the loads are powered by the supplemental and traction batteries.

11. The method of claim 10 further comprising altering relative amounts of power provided by the supplemental and traction batteries according to the magnitude.

12. The method of claim 10 further comprising altering relative amounts of power provided by the supplemental and traction batteries according to a temperature.

13. The method of claim 10 further comprising altering relative amounts of power provided by the supplemental and traction batteries according to the state of charge of the supplemental battery and a state of charge of the traction battery.

14. The method of claim 10 further comprising responsive to the state of charge falling below the predefined threshold, reducing the setpoint to less than that of the second DC/DC converter such that the loads are powered by the traction battery and not the supplemental battery.

* * * * *